INVENTOR.
RICHARD C. O'BRIEN
BY
Marechal, Biebel, French & Bugg
ATTORNEYS

Feb. 25, 1964 R. C. O'BRIEN 3,122,074

TYPE COMPOSING APPARATUS

Filed June 6, 1962 5 Sheets-Sheet 2

INVENTOR.

RICHARD C. O'BRIEN

BY

Marechal, Biebel, French & Bugg

ATTORNEYS

Feb. 25, 1964 R. C. O'BRIEN 3,122,074

TYPE COMPOSING APPARATUS

Filed June 6, 1962 5 Sheets-Sheet 3

INVENTOR.

RICHARD C. O'BRIEN

BY

Marechal, Biebel, French & Bugg

ATTORNEYS

INVENTOR.
RICHARD C. O'BRIEN
BY
Marechal, Biebel, French & Bugg
ATTORNEYS

INVENTOR.
RICHARD C. O'BRIEN
BY
Marechal, Biebel, French & Bugg
ATTORNEYS

United States Patent Office 3,122,074
Patented Feb. 25, 1964

3,122,074
TYPE COMPOSING APPARATUS

Richard C. O'Brien, Huntington, N.Y., assignor to Harris-Intertype Corporation, Cleveland, Ohio, a corporation of Delaware Filed June 6, 1962, Ser. No. 200,460
9 Claims. (Cl. 95—4.5)

This invention relates to typecomposing, and particularly to apparatus for selecting characters in desired sequence to form a line of composition, and for determining the relative space which will be occupied by these characters in a line of given length.

The present invention is described in relation to typesetting systems wherein the apparatus is divided into two parts, a first or keyboard machine which prepares a coded record such as a perforated paper tape containing the information for a page, or number of pages, of composition, and a second apparatus operated from the coded record and exposing a galley film used in preparing (for example) a lithographic or similar printing plate, or alternately a second apparatus in the form of a linecasting machine. In such a system the keyboard operator, or composer, manipulates the selection keys in a selected sequence determining the succession of desired characters in lines of composition.

The selection and space computing system in accordance with the invention comes into action immediately when the first character key is depressed to select the first character in a line of composition. The system makes a coded record (for example in binary code) which serves as identification of the selected character. Presumably a coded record may already have been made of the font from which characters are being selected. As each character is selected the system operates to determine the relative or unit width of that character with reference to the other characters in the font.

An important object of this invention is to provide improved character selection and space computing apparatus of the above described type which is capable of fast and exact operation, yet requires a minimum of parts and circuitry.

A further object of this invention is to provide such improved character selection and space computing apparatus wherein a single counter is utilized for both functions, and wherein the apparatus includes circuitry for operating the counter first to determine the unit width information for a selected character, and then to cooperate with other space computing apparatus in determining the sum of the spaces to be occupied by the selected characters.

As mentioned previously, the system is divided into two parts. When it is used in phototypesetting from a common matrix disc or plate the actual photographic exposure of the galley film is performed by a second or photographic apparatus which operates from the coded record prepared by the keyboard machine. In a preferred embodiment of the invention only three types of information are recorded in the coded record. These are character identification code, justification information, and function codes. The codes cover several different categories such as font selection, location of an interword space, in some instances point set factor information, correction information, kerning and leading information, and others.

The photographic machine determines the spacing for a projected character image merely by reading the character identification code from the prepared record and by having set thereinto the point set factor by which the unit width of a selected character is to be multiplied. The point set factor data can be determined from a reading of the coded record, where such information has been recorded as one of the function records, or can be set into the photographic machine manually by an operator. In either event, the photographic machine reads the character identification code, operates to project a properly sized image of the selected character onto the galley film and similarly determines the unit width of the character, multiplies this unit width by the point set factor, and operates through suitable transducers to produce character spacing movement between the galley film and the optical projection system to allot the appropriate space to the character image which has been recorded on the galley film.

In performing such multiplication operation electronically, the products thus obtained as a "burst" or "string" of electronic impulses of predetermined number may total something less than an integral number of discrete spacing units and in order to adapt the electronic spacing computing apparatus to produce outputs which are equal to an integral number of piclets, it is desirable to provide a divider counter which is capable of determining whether or not any count retained therein at the end of a character space computing operation is equivalent to more or less than one-half of a piclet. This divider counter can then clear itself and produce an output pulse for any remainder of one-half or more of a piclet and clear itself without an output for any remainder of less than one-half piclet.

When the second apparatus is a linecasting machine, or a phototypesetting machine which employs individual character matrices for each character, in a manner similar to linecasting machines, the space computing operations are not needed, and neither is the aforementioned divider counter. The size of the characters (or character images) is determined from the width of the individual matrices, and justification is achieved through use of adjustable space bands, as is well known. However, the coded record from the keyboard machine can be adapted to control such machines, and the invention contemplates use of the keyboard machine for this purpose.

Other objects and advantages of the invention will be apparent from the following description, the accompanying drawings and the appended claims.

In the drawings—

Figure 1:
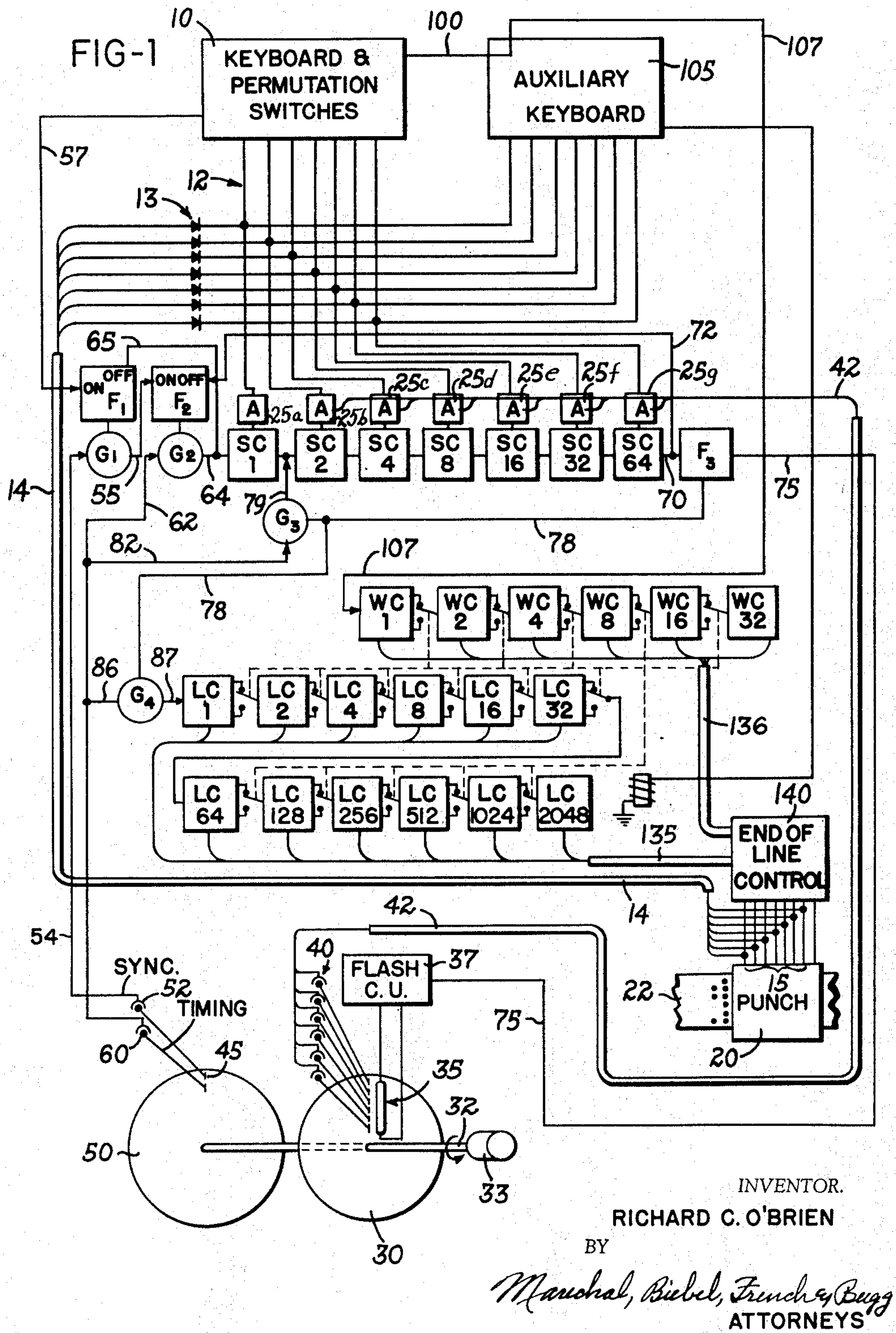
FIG. 1 is a schematic and block type diagram of the keyboard machine for a typesetting system in accordance with this invention.

The present invention includes a first or keyboard machine, shown schematically in FIG. 1, and which is adapted to prepare a record tape of the lines of composition, and a second machine which operates under control of the prepared tape to produce lines of composition. The keyboard machine includes a main keyboard 10 which has a number of keys for selection of different characters, together with permutation switches which cooperate with the keys in known manner to produce a binary selection code in the form of electrical pulses or voltage applied to one or more of the seven selection output lines 12. These lines are connected through diode rectifiers 13 to the first seven of eight encoding output lines 14, which lead to the control input lines 15 of a conventional coding and recording mechanism such as a punch unit 20 through which record tape, for example in the form of paper tape 22 to be perforated in a characteristic manner, is supplied for producing a permanent record respective of each character selected by operation of the keyboard 10.

All of the characters which make up a font, including upper and lower case letters, numerals, punctuation, etc., should be alloted space in accordance with their relative widths. For example, the character "M" obviously requires considerably more width than the character "i."

For the purpose of determining the relative or unit width of each selected character, the keyboard code output lines 12 are connected respectively to seven buffer amplifier units 25*a–g* which in turn are connected to preset the individual stages SC1, SC2, SC4, SC8, SC16, SC32, and SC64 of a selector counter-space computer binary counter. These stages may conveniently be in the form of conventional Eccles-Jordan or similar flip-flop stages connected in cascade. This counter is designed to perform a dual function, namely first to select the unit space information pertaining to a selected character which is identified by the input code through the aforementioned buffer amplifier, and secondly to cooperate with the space accumulator counter in computing the related space occupied by the selected character in a line of composition.

The unit space information is provided by a six digit binary code formed as differential light transmitting portions on a continuously rotating space code disc 30 (or an equivalent such as a drum) which is fixed to a rotating shaft 32 driven by motor 33. The code is formed by having light transmitting slits (or inversely opaque marks) on the disc 30 in each of the six code positions, and the selected unit space information is picked up by causing flashing of a high speed flash lamp 35, under the control of a flash control unit 37 to energize appropriate ones of the six pickup photocells 40, each one of which is positioned in alignment with a respective code position. These photocells have six separate output lines 42 which extend to the buffer amplifiers 25*b–g* for presetting the corresponding stages SC2—SC64, of the counter in accordance with the selected space code.

Accordingly, when a character is selected by pressing a key on keyboard 10, the character selection code is set up in lines 12 and is transmitted through the rectifiers 13 and lines 14 to the punch input lines 15, for the purpose of actuating the punch to produce a characteristic punch code in the record tape 22 which identifies the character selected. At the same time the selection code is transmitted directly via the lines 12 to the buffer amplifiers 25*a*–25*g*, to preset the selector counter to the identification code number. The unit space code information on the rotating disc 30 is arranged in complementary fashion such that the unit space code for a selected character is spaced from a fixed point on the disc by a number of places which is, in the count of places, a complement of the selection code entered in the selector counter.

The fixed position, also referred to as the synchronizing position, is determined by a synchronizing light transmitting mark 45 on a timing and computing disc 50 which is secured to shaft 32 in predetermined fixed position with respect to code disc 30, and cooperates with a photocell 52 and a light source (not shown) on the opposite side of disc 50 to produce a synchronizing pulse once for each revolution of the discs 30 and 50. This synchronizing pulse is transmitted through line 54 to a control gate circuit G1. This gate circuit is controlled by a flip-flop circuit F1 to follow the state thereof. Thus, when flip-flop F1 is in its first or "0" state G1 is "closed" or will not pass pulses transmitted thereto, and when F1 is in its "1" state, G1 is "open" and pulses transmitted through line 54 will be passed on through line 55 to a second control flip-flop F2. F1 is normally in its "0" state, closing gate G1, but will be switched to its "1" state by transmission of an initiate pulse through line 57 from keyboard 10. A pulse is transmitted through this line each time a character is selected, by depression of a key, or in some other suitable manner.

The timing disc 50 also is provided with pulse generating marks about its entire periphery in a radial zone separate from the synchronizing mark, and these timing marks cooperate with the aforementioned light source and a photocell 60 to generate timing pulses in line 62 which are transmitted to a further gate circuit G2 connected to follow flip-flop F2. Therefore, since F2 is normally in its "0" or "off" state, the gate G2 also will normally be "closed" and timing pulses will not pass through this circuit until F2 is caused to switch by receiving a pulse from line 55 through gate G1. However, when this occurs and F2 switches to its "1" state, G2 will "open" and pulses from line 62 will pass through G2 and its output line 64 to the input on stage SC1 of the selector counter. At the same time, a reset pulse will pass on line 65 to flip-flop F1, causing it to revert to its normal "0" or "off" state and gate G1 will again close. Timing pulses will continue to pass through G2 into the selector counter until this counter fills up. For example, assuming that the binary code for a selected character is 0010100 (corresponding to 20 in decimal numbers), then in order to fill up the selector counter 107 more pulses must be received, at which time the counter will read 1111111. The next or 108th pulse will clear the selector counter and cause an output pulse at its output line 70 which is connected to the input of a flip-flop circuit F3, and at the same time a reset pulse will pass through line 72 to reset F2 to its ""0" state, closing G2. F3 is connected through line 75 to control the operation of flash circuit 37, such that the flash control unit follows the state of F3.

Therefore, F3 is normally in a state where the flash control unit is deenergized, but a pulse through the selector counter output 70 causes F3 to change its state and a pulse is transmitted through line 75 causing the flash control unit to produce an instantaneous flash of light from the flash lamp 35 as the space code information in the 108th position past the synchronizing or starting position is aligned with the photocell read-out bank 40. The impulses generated by one or more of these photocells will be transmitted through the outputs 42 to preset the selector counter stages SC2—SC64, through the buffer amplifiers 25*b–g*, and these last six stages of the selector counter now function in cooperation with the disc 50 to transfer into the accumulator LC1 to LC2048 the relative or unit-space to be occupied by the just selected character.

The transfer operation proceeds as follows. When F3 was caused to change its state and actuate the flash control unit 37, this also produced a signal in line 78 causing the normally closed gate circuits G3 and G4 to open. The input to the selector counter is now through gate G3 and line 79 which receives impulses from the timing photocell 60. The pulses generated by photocell 60 thus pass through line 82 to gate G3 and thence are buffered into stage SC2 of the selector, to accumulate therein and eventually to fill up the last six stages of this counter which have now been reset to a binary number representing the unit space width of the previously selected character, from the space code disc 30.

The input to gate G4 is also from photocell 60 which transmits pulses through line 86 to gate G4, and when this gate is open to the input line 87 of the line length accumulator counter which comprises twelve binary stages identified as LC1—LC2048.

As the pulses are transmitted to and accumulated in the selector counter, this counter will begin to fill, and the number of pulses required to fill the selector counter will be the complement of the unit space code set into the counter from the photocell bank 40. Thus, when the last six stages of the selector counter are filled from the input through gate G3, then the next input pulse will transmit through line 70 to F3, causing this flip-flop to revert to its normal state and close the gate circuits G3 and G4. The total number of impulses transmitted through gate G4 to the line length accumulator counter during this interval will thus represent a digital input the sum of which is the total relative or unit space to be occupied by the selected character, and this information is stored in the line length counter in this manner for each selected character, with subsequently received space information being added to that already stored in the counter to maintain a summation of the space in the line of composition to be occupied by the characters, added to a preset value which represents the difference between a desired line length and the total capacity of the accumulator counter.

Similarly, every time there is an interword space in the line of composition the operator presses the space bar on the keyboard which closes a switch and transmits a pulse through output line 100 which connects through the auxiliary keyboard 105 to the line 107. This transmits input pulses to the first stage of a word space counter comprising six cascade connected binary stages WC1, WC2, WC4, WC8, WC16 and WC32. This counter maintains a summation of the number of interword spaces in the line of composition. At the same time, a code is set up in lines 12 which actuates the punch unit 20 to produce a code indicating the presence of an interword space in the line.

Figure 4:
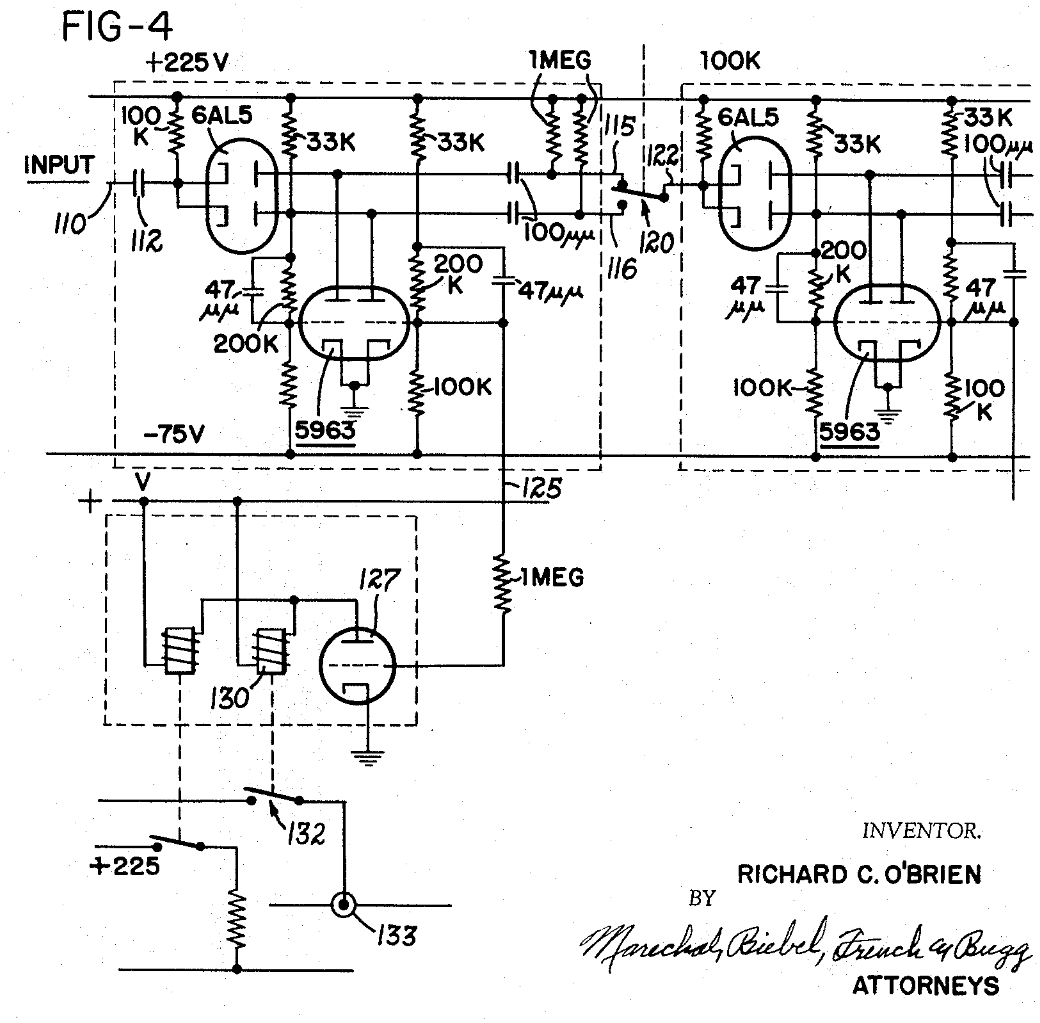
FIG. 4 is a diagram illustrating the manner in which the stages of the line length accumulator counter and the word space counter are interconnected and provided with suitable read out circuitry.

For reading the information in the line length accumulator counter and word space counter when composition of a line is completed, each stage of each of these counters is connected through a following amplifier to operate a relay. A typical arrangement of a binary stage with its following amplifier and relay, and showing also the reversing connection between successive cascade connected stages, is shown in FIG. 4. It should be understood that this arrangement is followed for all stages of the line length accumulator counter and the word space counter, with certain exceptions as will be noted.

Thus, referring to FIG. 4, the binary stage has an input connection 110 to an input condenser 112 connected to both cathodes of the input dual diode, which may be for example type 6AL5. The plates of the dual diodes are connected to the plates of a dual triode, for example type 5963 which is incorporated in a conventional Eccles-Jordan circuit as shown. These plate circuits are also connected through 100 mmf. capacitors to the forward and reverse output contacts 115 and 116 for this stage, which may be alternately connected through the relay switch 120 to transmit carry pulses to the input line 122 of the next stage.

In the usual manner, one side or the other of the dual triode is conducting while the opposite side is cut off, and this condition reverses in response to each input pulse received at the input capacitor 112. Thus, the grids of the dual triode are alternately, and oppositely, at a slightly positive potential, and a following connection 125 is provided to the grid of a triode amplifier tube 127 which controls the flow of current through the coil of a relay 130. When triode 127 conducts, relay 130 will be energized to close the contacts thereof and prepare a circuit through the contact 132 and a neon bulb 133 to a characteristic one of the eight encoding lines 15 which controls operation of punch 20.

This circuit is not completed until the end of the line of composition is reached, and therefore the outputs are shown schematically from the line length accumulator counter and the word space counter, respectively, as output cables 135 and 136 (FIG. 1) which go to the end of line control 140. Therefore, although the relay 130 of each stage of these counters may be energized or deenergized several times during the composition of a line, only the final setting of these relays, after the line has been completed, is utilized to complete the read out circuits which then cause coded information to be punched into tape 22 corresponding to the complement of the summation of space occupied by characters from the line length accumulator counter (i.e., the space remaining to be divided up for word space) and the direct reading of the number of word spaces in the line from the word space counter.

Figure 7:
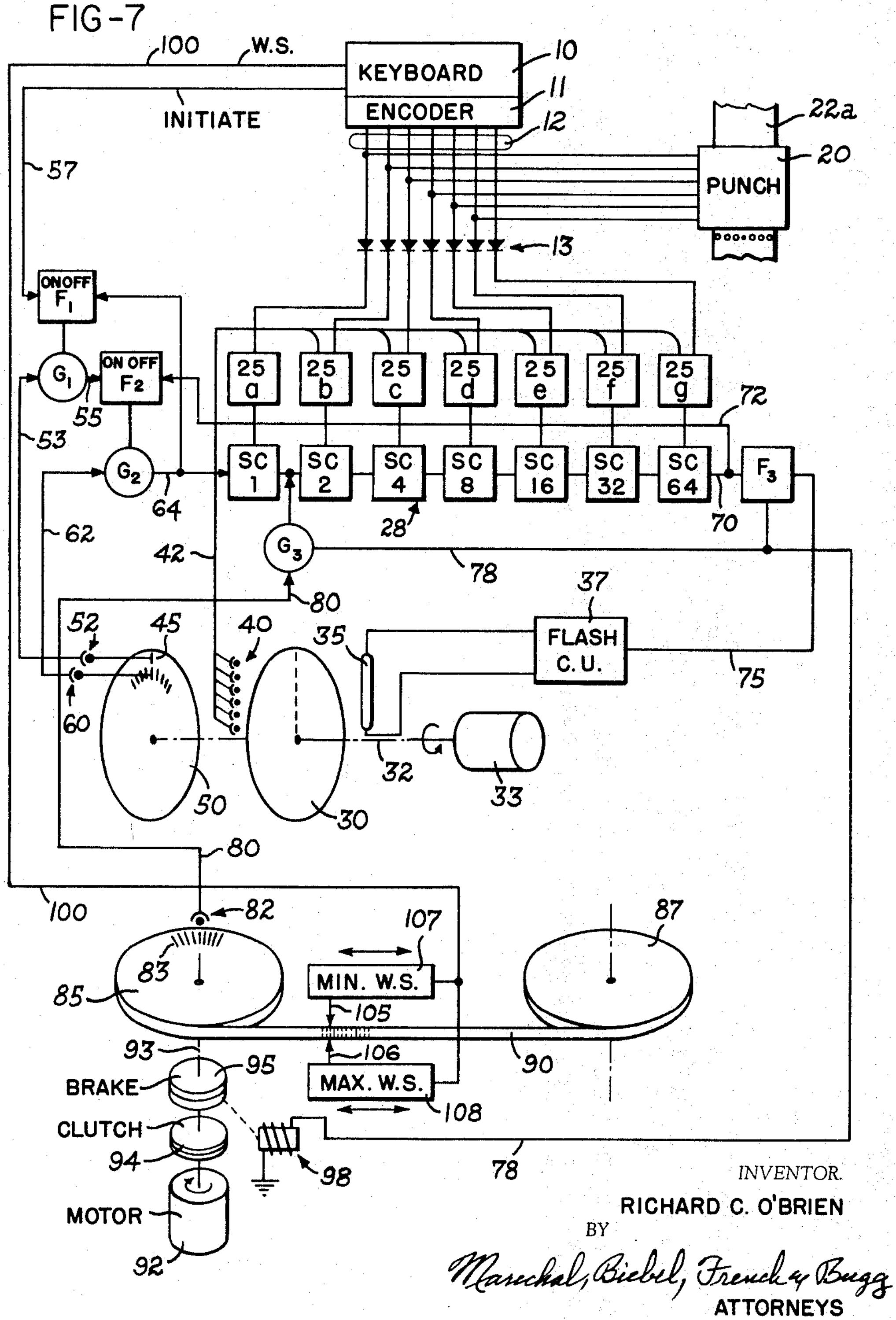
FIG. 7 is a diagram similar to FIG. 1 showing a modified keyboard machine for use with second machines of the linecasting type.

FIG. 7 is a schematic diagram of a similar system for use in preparing the well-known six channel perforated tape used to control linecasting machines. Here the perforated tape, which is well known in the art, utilizes the same character identification code for two characters, and there are special codes used to determine whether the following character identification codes relate to, for example, a lower case or an upper case letter. The linecasting machine assembles the individual mats which have molds thereof of two characters, for example the same character in different style. Depending upon whether the character identifying code was preceded by an "upper rail" code or a "lower rail" code, the mat will be assembled in one of two positions so that the proper mold for the desired style will be used in the casting operation.

Also in linecasting machines adjustable space bands are inserted wherever interword spaces occur, and justification is accomplished by expanding these bands when a full line of mats has been assembled, to bring the length of the assembled mats out to stops which are set apart according to predetermined line length. Each space band has a definite range of movement, and can be adjusted between a minimum and a maximum word space position. Therefore, when a keyboard operator is composing a line, he should be informed as to the amount of space being used as he prepares the perforated tape record which will assemble mats of predetermined lengths. He should also be informed as to the range of justification which is possible, by some type of indication of the space used if each of the the space bands were at their minimum thickness, and each of such space bands were at maximum thickness.

The present invention provides a system for accomplishing the aforementioned purposes, and a diagram of such a system is shown in FIG. 7. Since many of the parts are identical to parts shown and described in FIG. 1, the same reference characters are applied to identical parts.

Thus, the keyboard 10 is connected to an encoding device 11 which may be permutation switches or any type of mechanical encoder such, for example, as used presently to produce a characteristic binary code for each key of the keyboard which is depressed. The keyboard may be either a typewriter keyboard or a keyboard arranged as on a linecasting machine, and depending upon which arrangement is used there will be an appropriate encoding device. Details of such devices are known to those skilled in the art.

The output from the encoder is in the form of a seven line cable 12, and the first six of these run, as shown, to an ordinary six channel tape perforator or punch 20. It will be understood that in addition to character identifying codes there may be codes presented to the punch which identify different functions such as the upper or lower rail selection, shift or unshift, insertion of a space band (which occurs whenever the space bar of the keyboard is depressed), codes for additional space bands called "thin space," and the "rub-out" code, which is an erasing code. Other function codes may also be employed, but it is unnecessary to mention all of them for purposes of explaining the present invention.

The output lines 12 lead through diodes 13 to seven amplifiers 25*a–g*, and these amplifiers are each in turn coupled to preset the seven stages of a selector counter 28, comprising the seven cascade connected binary stages SC1—SC64. Each time that a character identifying code is impressed on the output lines 12 and punched into the tape 22*a*, this code is also set into the counter 28.

This will result in the "finding" of a unit space width code for that character on the space code information disc 30, as will be explained. The disc is continuously rotated by a shaft 32 driven by motor 33. A flash lamp 35, having a control circuit 37, is arranged to emit a flash of light at the appropriate time when the space code for the selected character passes the lamp. This code will appear as one or more light transmitting parts, arranged radially on disc 30 which is otherwise opaque, and the light passing through these light transmitting portions will cause appropriate electrical pulses to be emitted by corresponding ones of the reading photocells 40. The outputs of these photocells are directed through a six line cable 42 back into the amplifiers 25*b–g*, for the purpose of presetting the counter stages SC2—SC64 once the space code for a selected character has been determined.

Figure 2:
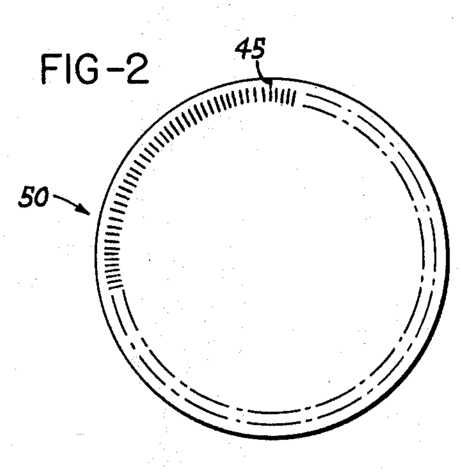
FIGS. 2 and 3 are detail views of the timing disc, and the associated pickups.
Figure 3:
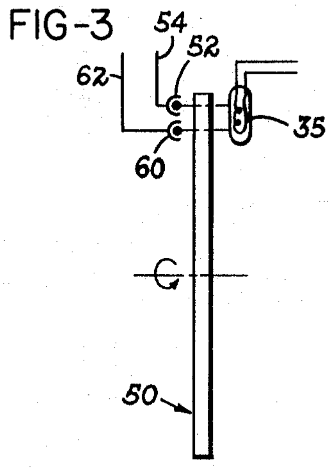

Also rotated by the shaft 32 is a synchronizing and timing disc 50 (the same as shown in FIG. 2) which includes the single timing pulse generating mark 45 for generating a pulse via photocell 52 once for each revolution of the disc 50. This pulse is transmitted through line 53 to gate circuit G1, which is normally closed. This gate is controlled by a flip-flop F1 which normally holds the gate closed, but which will change state to open G1 upon receiving an initiate pulse through line 57 from the keyboard, designated as an "on" signal. A pulse passes through line 57 each time any key on the keyboard is depressed.

Therefore, when a key is depressed, F1 is turned on and G1 is opened to pass the next synchronizing pulse coming through line 53 and this pulse proceeds through line 55 to turn on the normally off control flip-flop F2. This flip-flop normally holds gate G2 closed, but now it will open this gate. Timing pulses from disc 50 (as shown in detail FIG. 2) will then be generated by the timing photocell 60 and will pass through line 62 through G2 into its output line 64 which leads to the input of the first stage SC1 of counter 28. The first pulse into line 64 will pass also through line 65 to switch F1 off, and it remains off.

Recalling that this counter has been preset to a code number identifying the character selected by depression of the key which initiated this operation, pulses through G2 will continue until counter 28 fills up, and at this time the discs 30 and 50 will have rotated to the position where the unit space code information for the selected character appears on disc 30. When the counter fills up, an output pulse will pass from line 70, performing two functions. First it changes the state of flip-flop F3, causing it to emit an output pulse through line 75 to trigger the flash control unit 37 for flash lamp 35. At the same time the pulse travels also through line 72 to turn off flip-flop F2. Therefore, the timing and code selecting inputs to counter 28 are now off, with gates G1 and G2 closed.

The outputs from photocells 40 preset the stages SC2—SC64 to a code number which is the complement of the unit width code for the selected character. Gate G3 is controlled through line 78 by F3, and is normally held closed because F3 is normally in the off condition. When the pulse through line 70 changes the state of F3 and turns it on, this provides a continuing "on" signal through line 78 to hold G3 open as well as providing the flash triggering pulse through line 75.

The input through G3 to SC2 is from a line 80 which receives pulses from a photocell 82. This photocell "reads" the pulse generating marks 83 on the line length accumulator pulley or wheel 85, there being a conventional lamp or light source (not shown) on the other side of wheel 85 from photocell 82. The accumulator wheel cooperates with a further wheel 87 to carry a line length indicator tape or band 90 therebetween. This band is provided with visible graduations in terms of unit line lengths such as ems and/or fractions of an em (units). The spacing between these graduations, but not necessarily, corresponds to the spacing generator marks 83.

A continuously running motor 92 drives the shaft 93 of wheel 85 through a slip clutch 94, and a brake 95 is provided on shaft 93 for normally holding the shaft and wheel 85 stationary. This brake may be self-energized, and its release controlled by the energizing of solenoid 98 through a connection to line 78. Therefore, when F3 is turned on to open G3 this also releases brake 95 and permits wheel 85 to turn.

Pulses through line 80 proceed into the last six stages of counter 28 and continue until this counter fills up, causing an output pulse through line 70 which now causes F3 to change state again, reverting to its off condition and thereby closing G3 and causing brake 95 to be applied immediately to stop wheel 85. The amount of indicator or accumulator tape 90, taken up by wheel 85 will be a direct and visible indication of the relative amount of space occupied in the line by the selected character, and this operation repeats for each character selected.

Every time the operator depresses the space bar, indicating a word space, this causes an actuating pulse to be transmitted through line 100, in addition to causing the word space code to be set up in punch 20. There are two indicator members, shown schematically by the arrows 105 and 106, which function as the minimum word space and the maximum word space indicators, respectively. These indicators are moved along the indicator tape 90 by suitable driving escapements 107 and 108, each of which receives a driving pulse through line 100 every time the space bar is depressed. These escapements can be arranged, as by suitable choice of gearing or variation of their driving pawls, to move the respective indicators 105 and 106 by amounts which correspond to the relative space occupied by a space band at its minimum width and at its maximum width, respectively.

It will be understood, therefore, that the accumulator indicating tape 90 is drawn past the indicators in one direction and these indicators likewise are moved in the other direction so that when the keyboard operator nears the end of a line, which he can determine by viewing the numbered marks on tape 90, he can also determine whether he is within justification range, or whether perhaps he has gone too far and composed a "tight" line which does not have sufficient space for all the characters and space bands that he has selected. A justifiable line will be indicated by the appearance of that measurement corresponding to the line length at one of the indicators 105 or 106, or between them. If desirable, a suitable indicator flag or the like could be attached to tape 90 at the appropriate position corresponding to the length of the justified line to be composed, thus making the indication more visible to the keyboard operator.

At the end of composing each line, the tape 90 and indicators 105 and 106 are, of course, reset to their initial or "zero" condition by any suitable means. The perforated tape 22*a* is then capable of use by any conventional linecasting machine (or phototypesetting machine operating on the same principle) which is adapted for automatic operation from such record tape.

Figure 5:
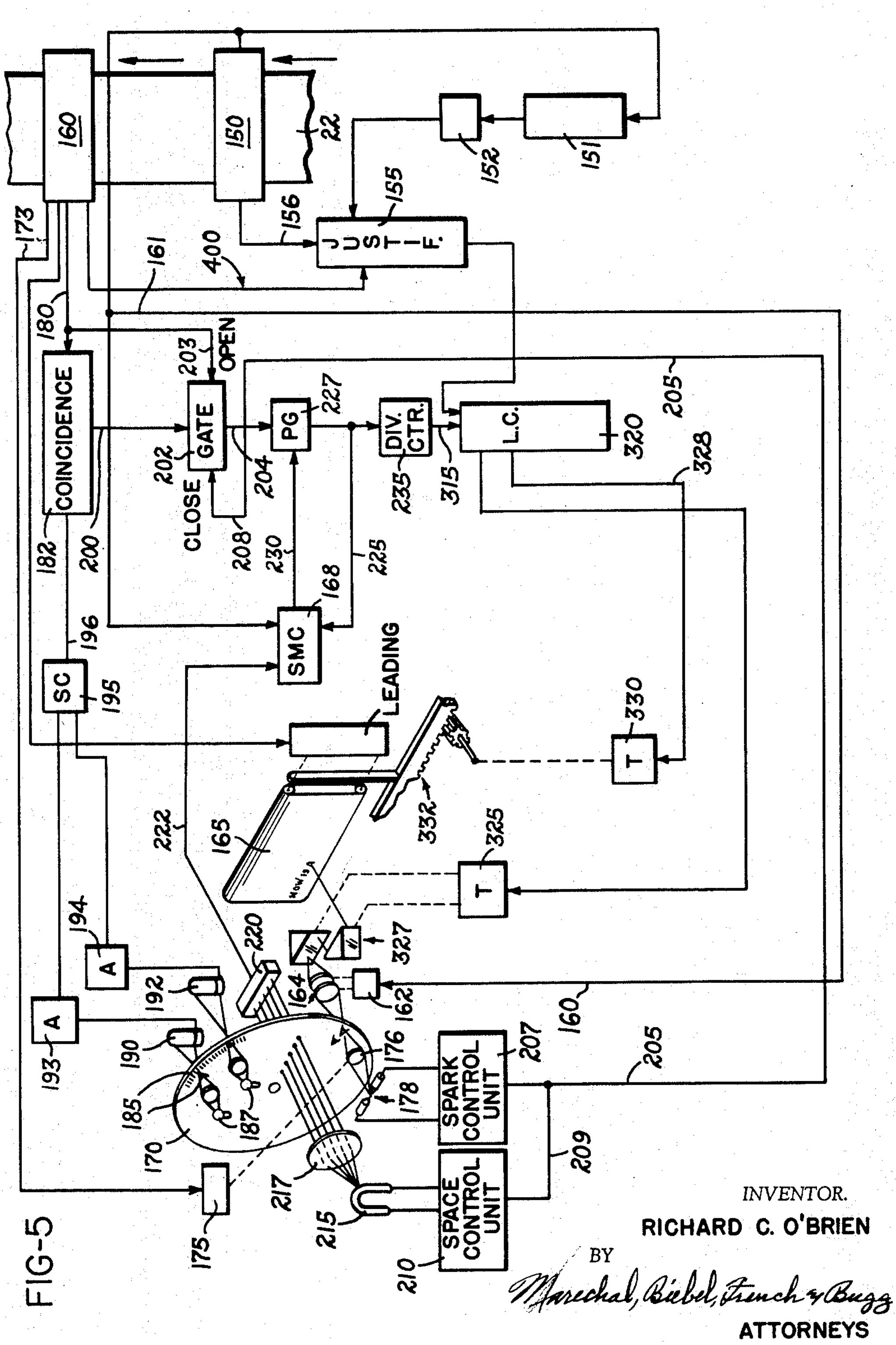
FIG. 5 is a schematic and block type diagram showing the essential parts of a suitable photographic machine.

FIG. 5 is a schematic and block-type diagram showing the arrangement of the essential elements of a photographic machine for using a record tape as prepared by the machine of FIGS. 1–4. In this machine the coded record, in the form of the punched tape 22, is supplied in the direction of the arrows to a pair of spaced reading heads 150 and 160, in that order. The first reading head 150 to scan the tape is arranged to sense end of line information, for example, information as to the space not occupied by characters, as to the number of word spaces, leading information, information as to acceptance or rejection of the character information already past the head 150, and non-justifying information. This reader 150 ignores information pertaining to character identification and/or spacing information. The tape is fed through the readers in the same direction as it was prepared, and therefore character and spacing data for an entire line of composition passes through the reader 150 before it senses the information at the end of the line, and when reader 150 does perceive this information it stops the tape there.

At the end of each line of composition, when the record tape is prepared in the keyboard machine, information is coded onto the tape by the end of line control 140, as noted previously. For purposes of controlling justification in the photographic machine, this information includes a representation of the space in a line of given or predetermined length not allotted to characters, and additional code information giving the number of interword spaces in the line. Thus, when the reader 150 stops at the end of line information, it reads the "unused space" information and sets it into a computer 151 for converting the relative or unit values of the "unused space" information into actual width values by multiplying by an appropriate point set factor which may also be read into computer 151 from the tape, or set in manually as desired.

The resultant product is then passed through a divider counter 152 and into the justifying computer 155 which also receives the "number of word spaces" information from reader 150 through line 156. This information is stored there until called for, and when called for is transmitted through output line 157 as a number of pulses representing the quotient of "unused space" divided by the number of interword spaces.

If the quotient resulting from dividing the number of interword spaces into the line remainder information is not an integral number, then any fractional remainder is retained in the justifier computer 155 and added to the output producing spacing for the next justified interword space.

In the meantime, the code tape is gathering in a loop between the reading heads, and the first piece of information for the line reaches the reader 160, which stops the tape on this information and proceeds to determine whether the information relates to character identification, or to some function first to be performed. Thus, assuming for purposes of example that the first line of composition on the tape has just reached the reading heads, and that the photographic machine has not been set up, and assuming that the machine is equipped for automatic reading and adjustment of the point set factor, then the point set factor information will be transmitted as a signal on the output line 161 from the reading head 150 to an optical control transducer 162 which may adjust the position of the size control optical system 164 to produce the desired size of character image on the galley film 165. Also, the point set factor code is transmitted through line 167 to preset the first eight stages of a fourteen stage binary counter 168 which functions as the space computer. Such an arrangement is shown in greater detail in United States Patent 2,846,932, issued August 12, 1958.

The character stencils or character image defining parts are provided on a character matrix disc or carrier 170, and may preferably be arranged with several fonts of characters located successively at a common radius on the disc, there being for example two fonts to a disc as denoted by the different types of character "A" shown on the disc at different distances from the axis of rotation. The reading head 160 will read character and font control code information on the tape, and assuming that there is a function signal representing the desired font, then a control signal will be passed from the output line 173 of reading head 160 to the font selection transducer 175 which may function, as indicated schematically, to direct a beam of light by the font control apparatus 176 from the spark unit 178 through one of the other of the radial zones on the disc in which the selected font is located.

The next piece of information on tape 22 may relate to identification of the first character to be projected, and thus the reader 160 will transmit a character identification code through its output line 180 to a suitable coincidence circuit 182. In separate radial zones about the discs 170, apart from the zones containing the character fonts, are impulse marks 175, there being at least one mark aligned with each character in each font capable of generating an impulse at the precise instant when the corresponding character is aligned with the optical system. These impulse generating marks may be aligned to move between suitable light sources 187 and pickup photocells 190 and 192 which will generate impulses accordingly to be amplified by the corresponding amplifiers 193 and 194 and transmitted to the selector counter apparatus 195 which is connected to the coincidence circuit 182, as shown at 196.

The particular character selection and coincidence circuitry employed may be any of several types, for example of the type disclosed in said United States Patent 2,846,932, or of either the type shown in United States Patent 2,944,472, issued July 12, 1960, or in the copending application of Richard C. O'Brien, Serial No. 720,840, filed March 12, 1958, now Patent No. 3,059,219. In any event, when the code number of the selected character received through line 180 is "found" by the selection system, then the circuit 182 will recognize the coincidence and transmit an output pulse through line 200 to a gate circuit 202 which may be opened or prepared for such coincidence pulse by a connection through line 203 with the input 180 to the coincidence circuit. Therefore, gate 202 passes the coincidence or selection pulse and it is transmitted through the gate output line 204 and through the control line 205 to the spark control unit 207 which then causes the sparking apparatus 178 to discharge and emit an instantaneous flash of light, creating an image of the selected character through the optical system 164. At the same time an impulse through line 208 closes the gate 202 to prevent passage of any further impulses from the coincidence circuit.

The selection impulse through line 205 also passes through line 209 to the space control unit 210 which is connected to flash the flash tube 215 at the same time that the spark unit 178 discharges. Light from the flash tube 215 is passed through a controlling lens 217 to cover a band or strip on the disc in which space code information is recorded corresponding to each character, in the form of twelve possible areas within the band which may be differentially light transmissive, such that one or more beams of light may pass in a code pattern to a bank of pickup photocells, one each of which is aligned with a position for a space code dot. Thus, the photocell pickup 220 will transmit pulses in one or more of its six pickup lines, as determined by the code on the disc, and these lines extend, as shown at 222, to the last six stages of the space computer, presetting these stages in accordance with the unit width for the just selected and exposed character. The computer 168 receives input pulses through line 225 from a pulse generator 227 which is started into operation by receiving a pulse from the gate output 204. Pulse generator 227 may operate at a substantially high speed, for example in the neighborhood of 100 kilocycles or more.

The product of the unit width and point set factor will represent the actual spacing in picas and piclets to be given to the previously projected character image. This product is represented by causing the space computer 168 to emit an output pulse through line 230 effective to turn off pulse generator 227 when the space computer fills up, it having been preset with a space unit width code and the point set factor as previously described. This operation is described in further detail in said United States Patent 2,846,932. The output 225 of pulse generator 227 also is connected to pass to the input of a divider counter circuit 235, and thus the total number of pulses emitted in a burst or string from pulse generator 227, from the time it begins operation as a result of the coincidence or selection pulse until it was shut off by an output from the space computer, will represent the actual spacing to be given to the projected character image.

The information relating to point size of the characters is supplied through the eight lead cable 167 (FIGS. 5 and 6) with each of the leads being connected to a respective suppressor grid of an "and" gate tube, G1–G8, and these gates in turn control the presetting of the individual stages of an eight stage binary counter, hereinafter designated the "P" counter, and having stages P1–P8, respectively, and which therefore is capable of handling a count up to 256. The information supplied through cable 167 may be either from reading the punched tape, or through manual setting by an operator of a switch which is capable of impressing a positive pulse on a respective line of the cable. Thus, by appropriately presetting the "P" counter, either from the record tape or manually, to a value which is the 256-complement of two times the desired point size, this counter is prepared for a space computation. This is the first portion of space computer 168.

The other basic unit of the space computer is the "N" counter having six stages N1–N6, each of which may be preset by a pulse received through amplifiers NA1–NA6 from the space reading photocells 301 and 301*a*, 302 and 302*a* . . . 306 and 306*a*, in the reading bank. As will be seen from the drawing (FIG. 6) each amplifier for presetting the "N" counter has a choice of two photocells, for example 301 or 301*a*. These may be utilized to read, selectively, unit space information for characters in different fonts on the matrix disc, and the selection may be accomplished by a selector relay, shown for purposes of example as the six blade relay 310 which controls these photocell leads simultaneously in any known manner.

The system also includes a four stage binary counter, the divider counter 235, and having four cascade connected binary stages CS1, CS2, CS3 and CS4, which may also be designated as the character space counter. The output of the last stage CS4 is connected through line 315 to the line length counter 320 (FIG. 5). Each pulse through this line represents a space of one piclet, equal to one-sixty-fourth of a pica or approximately 0.0026 inch.

The line length counter 320 may be a suitable twelve stage binary counter which operates to control operation of the spacing transducers. The first six stages of counter 320 are connected to the spacing transducer 325 which controls displacement of the spacing prism system 327, used to perform spacing functions of less than a full pica. The seventh stage of counter 320 is connected through line 328 to the pica spacer transducer 330 which controls spacing movement of the film carriage indicated by the general reference numeral 332. Details of such a spacing system are described and claimed in the copending application of Hooven and O'Brien, Serial No. 661,633, filed May 27, 1957, now Patent No. 2,966,835.

Thus, the spacing transducers 325 and 330 follow the first seven stages of line counter 320 and produce cumulative relative spacing movement between the galley film 165 and the optical system 164, with the appropriate spacing for each character image accomplished immediately following projection thereof onto the galley film.

Figure 6:
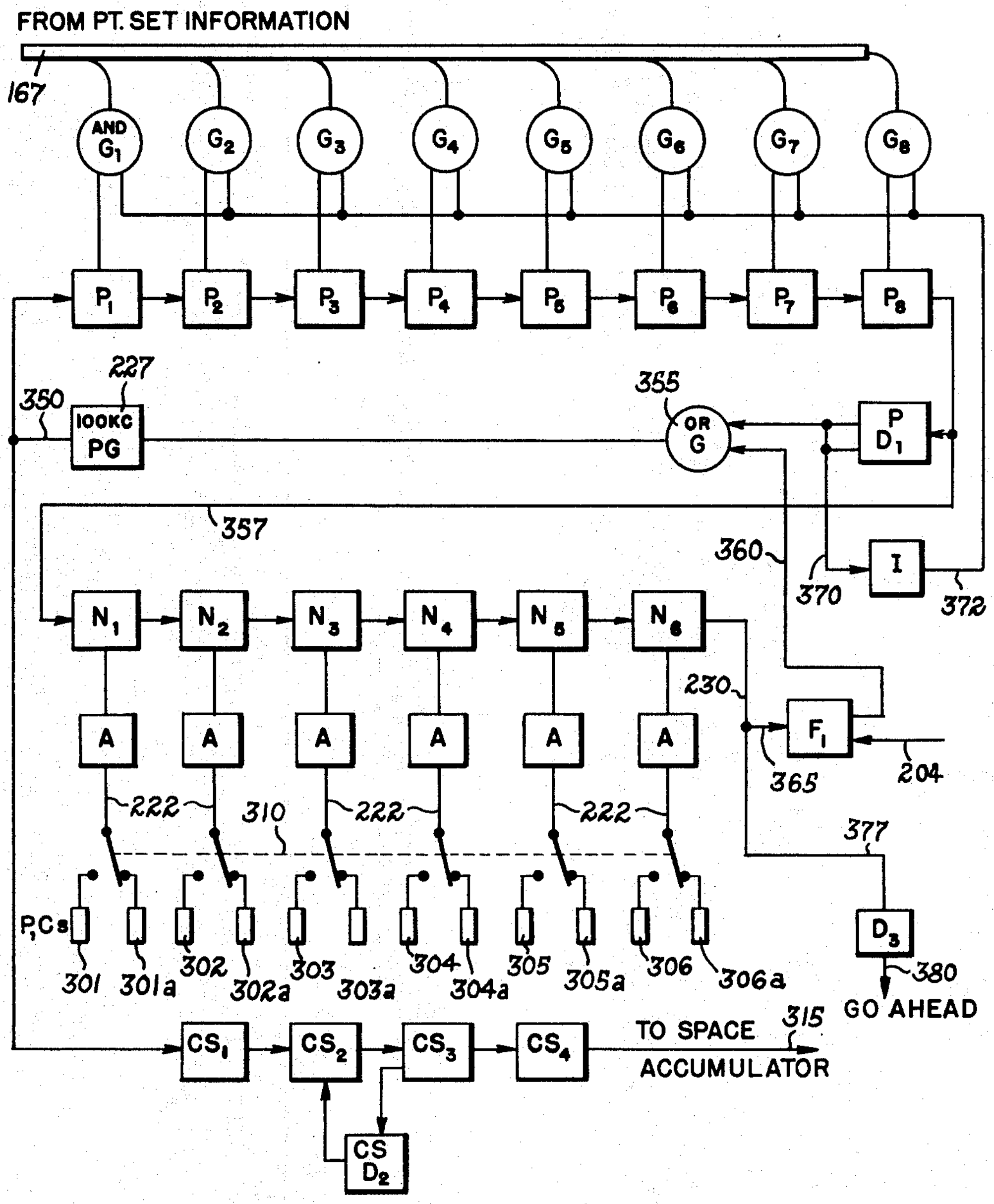
FIG. 6 is a diagram of the divider counter circuit.

Referring to FIG. 6, input pulses to the "P" counter (stage P1) and to the divider or character spacing counter (stage CS1) are provided through line 350 from the 100 kc. pulse generator 227, the operation of which is controlled by an "or" gate circuit 355. Input pulses to the "N" counter are provided by the output of the "P" counter, and thus the last stage P8 is connected to supply an input to the first stage N1 of the "N" counter, as designated by line 357. This line is also connected through a delay circuit D1 to control the "or" gate 355. The other input to "or"gate 355 is through line 360 from a control flip-flop F1 which may be flipped to its "1" position by a pulse entered through line 204, signifying a selection coincidence in the character selector of the second machine which has resulted in photographing of a character and also providing an entry through the photocells to the "N" counter. The control flip-flop is flopped or returned to its "0" state by receipt of a pulse from line 365 which is connected to the output 230 of stage N6 the last stage in the "N" counter.

As previously mentioned, an output from the "P" counter, P8, will pass through the delay circuit D1 to the "or" gate 355. The pulse from D1 also passes through line 370 to a phase inverter circuit I, and thence to line 372 which is connected to the "and" gates G1–G8 for the purpose of resetting the "P"counter. The output from the "N" counter (line 230) is utilized to reset the character space divider counter by transmitting a pulse through a flip-flop stretcher S1 and reset line 375 to the reset amplifiers CA1, CA2, CA3 and CA4 which are connected to the corresponding four stages of the divider or character space counter to preset each stage to the flipped or "0" condition. At the same time, an output from S1 will pass through line 377 to a delay circuit D3 which in turn will transmit a delayed output pulse through line 380 to an "or" gate (not shown) controlling the operation of the reading head 155 (FIG. 5).

The divider counter is arranged to perform in the following manner. It will have an output available through line 315 after twelve input pulses are received from line 350, thus operating to divide by twelve the pulses received and to provide output pulses each of which is equal to a space of one piclet, derived from the product of two times the point size and unit width value divided by twelve. This function is accomplished by reason of a feed back loop in the divider counter (coupled from the third stage CS3 back into the second stage CS2) through a delay circuit D2 which may provide a delay in transmission of about ten micro-seconds.

The following example will clarify the operation of the above described circuit, referring particularly to FIG. 6. Assuming a desired point size of four and one-half, and that the unit width value for a selected character is five, the "P" counter is preset by multiplying the point size by two and determining the 256 complement, which is 247. This number is preset into the "P" counter through the gates G1–G8 to flip into the "1" conditions the following stages of that counter: P1, P2, P3, P5, P6, P7, P8.

The units or "N" counter is preset to the 64 complement of the unit width value, and therefore for a five unit character (assumed) the "N" counter is preset to 59. This is done by energizing the photocells 301*a*, 302*a*, 304*a*, 305*a* and 306*a* during selection of the character, to preset into the flipped or "1" condition the stages N1, N2, N4, N5 and N6.

The selector coincidence pulse through line 204 (the output of gate 202 in FIG. 5) will flip the control circuit F1 to the "1" condition and turn on pulse generator 227. For each group of nine pulses received into the "P" counter, one output pulse is available at line 357. After a ten micro-second delay (D1), during which time pulse generator 227 is shut off, an inverted pulse will pass through line 372 to reset the "P" counter to the value 247 (or 11101111). This same output pulse from the "P" counter (P8) passes from line 357 to the input of the "N" counter, and when five such pulses have accumulated in the "N" counter an output signal pulse is available in line 230 to flop the F1 control, turning off the pulse generator 227 until the next character selection.

Therefore, a total of forty-five pulses (nine times five), are coupled into the "P" counter to arrive at an output signal pulse indicating the end of computation. These forty-five pulses are at the same time being coupled into the divider or character space counter 235 through line 350. This counter is, as previously explained, arranged to divide its input by twelve to convert the product of two times the point size and the unit width value into piclets. Therefore, the forty-five pulses coupled into CS1 will result in three piclet or output pulses in line 315 and a remainder of nine pulses in the divider counter (forty-five divided by twelve). These extra nine pulses will flip the stages CS1, CS2 and CS4 into the "1" condition, where the divider counter will stop at the end of the computation.

These left over pulses will remain in the divider and be added to the results of the next computation of a character space. Since they represent approximately two-thirds of a piclet, which in turn has a physical measurement of only 0.0028 inch, they may be effectively disregarded in the spacing of any single character. However, since this small accumulated excess will be added to the following character space computation, the error will not accumulate.

When the second reader 160 finds the code which indicates presence of a justified word space, it will transmit an initiating signal to line 400 which will cause the justifying computer 155 to operate and to perform the necessary spacing computation for a justified word space, with its output directed into the accumulator counter 320 which in turn controls the spacing transducer as above mentioned. Since, as previously explained, the point set factor has been taken into account in setting up the justifying computer from the "unused space" information read by the reader 150, the spacing provided for the justified word space automatically corresponds to the point set factor used in adjusting the space alloted to each character from relative or unit values into actual space values.

Accordingly, the present invention provides a novel typesetting system wherein the keyboard machine prepares a record of information to compose justified lines of composition with a minimum of apparatus. The information for composing of any given line is recorded on a relative basis, and thus the entire line may be expanded or contracted by the composer, either by setting appropriate point set factors through the keyboard machine into the control tape, or alternately by the operator of the typesetting (i.e., tape operated) machine, who may insert such factor manually into the justifying computer. Such manual insertion of the factor also must be accompanied in the phototypesetting machine version, by equivalent setting of the character space computer 168 (i.e., the "P" counter portion thereof) and also by equivalent setting of the optical control transducer 162.

This application is a continuation-in-part of co-pending application Serial No. 39,860, filed June 30, 1960, now abandoned.

While the forms of apparatus herein described constitutes preferred embodiments of the invention, it is to be understood that the invention is not limited to these precise forms of apparatus, and that changes may be made therein without departing from the scope of the invention which is defined in the appended claims.

What is claimed is:

1. In apparatus of the character described, the combination of a selector counter, means connected to preset said counter to a code number representing a selected character in a line of composition, means operative with said counter to determine from the character selection code a further code number representing the unit width of the selected character relative to other characters of varying widths, means connected to reset said counter to said further code number, accumulator means for receiving unit width information and operative to maintain a continuous sum thereof representing the relative space in a line of composition to be occupied by the selected characters, and means operative to transfer such further code number as unit width information from said counter into said accumulator means.

2. Space computing apparatus for typesetting machines, comprising means for creating a selection code representative of a character to be reproduced, a selector counter, means including said selector counter responsive to said selection code to determine and represent the unit width of the selected character relative to other characters of varying widths, a connection between said selector counter and said unit width representing means operative to reset said selector counter to a code number corresponding to said unit width of the selected character, means connected with said counter to produce a digital output representing the unit width of each selected character, and accumulator means operative to maintain a sum of said digital outputs representing the relative space in a line of composition to be occupied by the selected characters.

3. Apparatus for preparing a coded record for use by typesetting machines, comprising a keyboard and means operative thereby to create a coded representation of each character selected by actuation of a key, means connected to produce a permanent coded record of the character identifying code to assemble information for a line of composition, means responsive to the character identification code to compute the relative space to be occupied by each selected character and to create a signal which is a digital representation of such space information, accumulator means connected to maintain a sum of such digital signals, means responsive to completion of a line of composition to produce a permanent coded record related to the sum then represented in said accumulator means, means maintaining a sum of the number of spaces between words in the line of composition, and means for recording a coded representation of the number of word spaces used in each line.

4. In apparatus of the character described, the combination of a selector counter, means connected to preset said counter to a code number representing a selected character in a line of composition, means operative with said counter to determine from the character selection code a further code number representing the unit width of the selected character relative to other characters of varying widths, means connected to reset said counter to said further code number, means operating with said counter to produce an output representing the unit width of each selected character, accumulator means receiving said outputs and operative to maintain a continuous difference between the space to be occupied by the selected characters in a line of composition of predetermined length and such predetermined length, and read out means operative with said accumulator means to represent in coded form the final difference therein at the end of a line of composition.

5. Apparatus for preparing a code record for use in photographic typesetting, comprising a keyboard and means operative thereby to create a coded representation of each character selected by actuation of a key, means connected to produce a permanent record of each character identifying code in the form of markings on a record tape to assemble information for a line of composition, means responsive to said character identifying code to represent the relative space to be occupied by each selected character and to create a signal which is a digital representation of such relative space information, an accumulator counter connected to receive said signals and to maintain a sum thereof, read out means operative by said accumulator counter to record a code related to the sum therein, means maintaining a sum of the number of spaces between words in the line of composition, and means for recording the number of word spaces used in each line in coded representation or said tape along with code information derived from said accumulator counter.

6. In a typesetting system the combination of a keyboard and means operative thereby to create a coded representation of each character selected by actuation of a key, a unit width memory device providing unit width space code information for each character, a selector counter arranged to be preset from said keyboard and operatively connected with said memory device to locate the unit width code for a selected character, an output from said memory device coupled to said counter and adapted to reset said counter to a number representing the unit width of the selected character, means operating with said counter to produce a digital output corresponding to the unit width information in said counter, an accumulator operative to maintain a continuous sum of said digital outputs representing the relative space in a line of composition to be occupied by the selected characters, and visual indicator means connected to said accumulator to represent the relative space used during composing of a line and the relative space in a line of predetermined length not alloted to characters.

7. A system as defined in claim 6 wherein said visual indicator includes further means actuated from said keyboard to show the possible space occupied by space bands at the minimum and maximum widths of the space bands.

8. A phototypesetting system comprising a keyboard and means operated thereby to create a unique selection code representing each character selected by actuation of a key, means connected to said code creating means producing a record of each character code in the order selected to assemble information for a line of composition, means controlled by said character selection code means to provide a digital signal representing the relative space alloted to the selected character, an accumulator counter connected to receive and to sum said digital signals, means maintaining a sum of the number of spaces between words in a line of composition, means operated from said accumulator counter and said word space sum at the end of each line to produce and to record a coded representation of space not occupied by characters and of the number of word spaces in the preceding recorded line, a character carrier having characters of different relative widths thereon and code data associated with each character representing its relative width with respect to the other characters, a flashing light source operable to create images of individual characters from said carrier, selector means controlled by the selection code record to operate said light source and to produce successive images of characters in accordance with said record, reading means operable with said selector means to read the relative width code for each selected character at the time its image is produced, optical means cooperating with said light source to form character images of predetermined and variable size relation with respect to the character on said carrier in accordance with a point set factor, means for introducing a variable point set factor into said system, a high speed computer having one input control variable with the selected point set factor and a further input controlled by said reading means, said computer operating after projection of each character image to provide a digital output related to the space occupied by the character image, and a divider receiving said output from said computer and transmitting a distinct digital spacing output representing a predetermined fraction of the total input from said computer, each output digit from said divider representing an actual fractional width measurement of the character image.

9. In a typesetting system the combination of a keyboard and means operative thereby to create a coded representation in a record tape of each character selected by actuation of a key, a unit width memory device providing unit width space code information for each character, a selector counter arranged to be preset from said keyboard and operatively connected with said memory device to locate the unit width code for a selected character, an output from said memory device coupled to said counter and adapted to reset said counter to a number representing the unit width of the selected character, means operating with said counter to produce a digital output corresponding to the unit width information in said counter, an accumulator mechanism operative to maintain a continuous sum thereof representing the relative space in a line of composition to be occupied by the selected characters, visual read out means actuated from said accumulator during composition of a line to represent the relative space in a line of predetermined length not alloted to characters, means operative from said keyboard to indicate the sum of interword spaces in composition of a line and to create a code in the record tape indicating the location of an interword space to be adjusted for justification of the line, and a connection between said word space indicating means and said read out means operative to show the space remaining in a line in terms of the maximum range of adjustment of space bands to be used for justifying the line.

No references cited.